United States Patent
Sugawara

(10) Patent No.: US 7,852,424 B2
(45) Date of Patent: Dec. 14, 2010

(54) LIQUID CRYSTAL DISPLAY DEVICE WITH RELATIVELY FLAT, SLIGHTLY BENT FILM MEMBER CONNECTED BETWEEN FRAME AND PERIPHERAL OF DISPLAY SO AS TO BLOCK A GAP FORMED THEREBETWEEN

(75) Inventor: Hideaki Sugawara, Kanagawa (JP)

(73) Assignee: NEC Corporation, Tokyo (JP)

( * ) Notice: Subject to any disclaimer, the term of this patent is extended or adjusted under 35 U.S.C. 154(b) by 534 days.

(21) Appl. No.: 11/316,919

(22) Filed: Dec. 27, 2005

(65) Prior Publication Data

US 2006/0152471 A1    Jul. 13, 2006

(30) Foreign Application Priority Data

Jan. 13, 2005    (JP) .............................. 2005-006212

(51) Int. Cl.
    *G02F 1/1333*    (2006.01)
(52) U.S. Cl. ......................................... 349/58; 349/122
(58) Field of Classification Search ............. 349/58–60, 349/122; 362/534
    See application file for complete search history.

(56) References Cited

U.S. PATENT DOCUMENTS

| 5,150,231 | A | * | 9/1992 | Iwamoto et al. ................ 349/60 |
| 2001/0010569 | A1 | * | 8/2001 | Jin et al. ........................ 349/58 |
| 2005/0243242 | A1 | * | 11/2005 | Moon et al. .................... 349/60 |

FOREIGN PATENT DOCUMENTS

| JP | 4-250419 | 9/1992 |
| JP | 9-171173 | 6/1997 |
| JP | 10-207399 A | 8/1998 |
| JP | 10-239693 | 9/1998 |
| JP | 11-281968 | 10/1999 |
| JP | 2002-174811 | 6/2002 |
| JP | 2005-005003 | 1/2005 |

OTHER PUBLICATIONS

Chinese Office Action regarding JP 2006100005496.7 dated Sep. 7, 2007. Attached is the English translation of a portion of the office action.

* cited by examiner

*Primary Examiner*—John Heyman
(74) *Attorney, Agent, or Firm*—Young & Thompson

(57) ABSTRACT

A film member is provided between a liquid crystal panel and the front panel of a front frame. The film member is thinner than the gap between the liquid crystal panel and the front panel. The film member is strip-shaped, one end part thereof in the width direction is attached to the front panel, and the other end part thereof is in contact with the liquid crystal panel. The film member is formed from PET, has a thickness of 25 to 100 μm, and is black or gray in color. Four such strip-shaped film members are positioned so as to surround the opening of the front frame. A large load is thereby not placed on the liquid crystal panel, the thickness of the device as a whole in not increased, and the ingress of debris and light leakage can be prevented.

11 Claims, 5 Drawing Sheets

LIQUID CRYSTAL DISPLAY DEVICE WITH RELATIVELY FLAT, SLIGHTLY BENT FILM MEMBER CONNECTED BETWEEN FRAME AND PERIPHERAL OF DISPLAY SO AS TO BLOCK A GAP FORMED THEREBETWEEN

BACKGROUND OF THE INVENTION

1. Field of the Invention

The present invention relates to a liquid crystal display device provided with a liquid crystal panel and a frame for covering the periphery of the display surface of the liquid crystal panel.

2. Description of the Related Art

A liquid crystal display device is usually provided with a backlight, a liquid crystal panel for displaying an image by transmitting light emitted from the backlight, and a frame for covering the periphery and side surfaces of the display surface of the liquid crystal panel. A cushioning member composed of silicone rubber, foam material, or the like is also provided between the liquid crystal panel and the frame in order to prevent light leakage or ingress of debris (see Japanese Laid-Open Patent Application Nos. 9-171173 and 2002-174811, for example).

FIG. 1 is a partial cross-sectional diagram showing a conventional liquid crystal display device. A box-shaped rear frame 2 is provided in this conventional liquid crystal display device 101. The rear frame 2 is composed of a rectangular base panel 2a and four side panels 2b that stand perpendicularly with respect to the surface of the base panel 2a from the edges of the base panel 2a. In the following description, the direction in which the side panels 2b stand as viewed from the base panel 2a is referred to as the forward direction 21, the opposite direction thereof is referred to as the rearward direction 22, and the direction orthogonal to the forward direction 21 and rearward direction 22 is referred to as the lateral direction 23.

A frame-shaped resin chassis 3 is provided inside the rear frame 2. A main body 3a disposed parallel to the side panels 2b of the rear frame 2 is provided to the resin chassis 3. In the plane that includes the lateral direction 23, the main body 3a is elbow-shaped in cross-section, and a groove 3b is formed on the rear surface of the main body 3a. The outer surface of the main body 3a is connected to the inner surfaces of the side panels 2b of the rear frame 2. An extension 3c also extends towards the inside of the frame from the end of the main body 3a on the side of the forward direction 21. The main body 3a and the extension 3c are integrally formed from resin.

An optical waveguide 4 and a lamp (not shown in the drawing) for emitting light are provided inside the resin chassis 3. The lamp and the optical waveguide 4 are held in place by the resin chassis 3. The lamp is positioned at the end inside the resin chassis 3, and is configured so as to emit light to the optical waveguide 4. The optical waveguide 4 is positioned at the center inside the resin chassis 3, and is configured so that light emitted from the lamp enters the side surface thereof, and the light is emitted towards the forward direction 21 from the front surface of the optical waveguide 4. An optical sheet 5 is affixed to the front surface, that is, the light-emitting surface, of the optical waveguide 4. The optical waveguide 4 and the optical sheet 5 are positioned behind the extension 3c of the resin chassis 3, and the peripheral edges of the optical waveguide 4 and the optical sheet 5 are held between the base panel 2a of the rear frame 2 and the extension 3c of the resin chassis 3. The backlight is formed from the lamp, the resin chassis 3, the optical waveguide 4, and the optical sheet 5.

A liquid crystal panel 6 is also provided in front of the extension 3c of the resin chassis 3. As viewed from the forward direction 21, the liquid crystal panel 6, the optical sheet 5, and the optical waveguide 4 are arranged in substantially the same position. The periphery of the rear surface of the liquid crystal panel 6 is attached to the extension 3c of the resin chassis 3 by double-sided tape 51. A silicone spacer is also sometimes provided instead of the double-sided tape 51.

A front frame 7 is also provided so as to cover the front and sides of the rear frame 2. A frame-shaped front panel 7a and four side panels 7b that stand towards the rearward direction 22 from the edges of the front panel 7a are integrally formed in the front frame 7, and an opening 7c is formed in the center of the front panel 7a. The front panel 7a of the front frame 7 is positioned in front of the liquid crystal panel 6, and the side panels 7b are positioned on the outside of the side panels 2b of the rear frame 2. As a result, the front frame 7 covers the periphery of the liquid crystal panel 6, the resin chassis 3, and the side panels 2b of the rear frame 2. The frame 8 is formed from the rear frame 2 and the front frame 7.

A cushioning member 52 is provided between the periphery of the liquid crystal panel 6 and the front panel 7a of the front frame 7. The cushioning member 52 is in contact with both the front surface of the liquid crystal panel 6 and the rear surface of the front panel 7a. The cushioning member 52 is formed from silicone rubber, a foam material, or another material having cushioning properties, and the thickness thereof is about 0.3 to 1.0 mm. The liquid crystal panel 6 is held between the extension 3c of the resin chassis 3 and the front panel 7a of the front frame 7 via the double-sided tape 51 and cushioning member 52, respectively.

In this conventional liquid crystal display device, the cushioning member 52 is provided between the periphery of the liquid crystal panel 6 and the front panel 7a of the front frame 7, whereby debris are prevented from entering the frame 8 from the outside. Prevention of light leakage can also be anticipated by providing the cushioning member 52. The term "light leakage" refers to the effect whereby light emitted from the backlight and transmitted through the liquid crystal panel 6 is diffusely reflected between the liquid crystal panel 6 and the front panel 7a of the front frame 7 and leaked out from the gap between the liquid crystal panel 6 and the front frame 7, and this leaked light is visible to the viewer depending on the angle from which the viewer views the liquid crystal panel 6. Furthermore, in this conventional liquid crystal display device, the liquid crystal panel 6 is bonded to the resin chassis 3 by the double-sided tape 51, whereby debris that have entered the frame 8 are prevented from penetrating between the optical waveguide 4 and the liquid crystal panel 6.

However, the conventional technique described above has such drawbacks as those described below. When there is low precision in the shapes of the members constituting the liquid crystal display device, the gap between the frame and the liquid crystal panel becomes narrow at a part of the frame, the thickness of the cushioning member increases beyond design specifications, and other effects occur, and the cushioning member sometimes exerts an increased load on the liquid crystal panel. Since the liquid crystal panel is bonded to the resin chassis by double-sided tape or a silicone spacer, a continuous load is placed on the liquid crystal panel when either the liquid crystal panel or the resin spacer is warped. Furthermore, when there are rapid changes in the temperature of the environment surrounding the liquid crystal display device, the double-sided tape or silicone spacer shrinks and/or expands and exerts a load on the liquid crystal panel. When a significant physical load is placed on the liquid crystal panel in this manner, display abnormalities occur in the liquid crystal panel. An IPS-type (In Plane Switching: system for switching within a plane) liquid crystal panel is particularly prone to display abnormalities that occur due to a physical load.

Since the space between the frame and the liquid crystal panel must naturally be widened in order to position the cushioning member between the frame and the liquid crystal panel, the thickness of the liquid crystal display device as a whole increases.

The material cost of the liquid crystal display device also increases because of the expensive silicone rubber or foam material used to form the cushioning member.

SUMMARY OF THE INVENTION

An object of the present invention is to provide a liquid crystal display device at low cost whereby no large load is placed on the liquid crystal panel, the overall thickness is not increased, and the ingress of debris and light leakage can be prevented.

The liquid crystal display device according to the present invention has a liquid crystal panel, a frame positioned so as to cover the periphery of the display surface of the liquid crystal panel without coming into contact with the liquid crystal panel, and a film member having a first portion connected to the frame, a second portion separated from the first portion and in contact with the liquid crystal panel, and a thickness that is smaller than the gap between the liquid crystal panel and the frame.

In the present invention, since the first portion of the film member is connected to the frame, and the second portion thereof is in contact with the liquid crystal panel, the film member blocks the gap between the frame and the liquid crystal panel, debris can be prevented from entering the frame from the outside, and light can be prevented from leaking out of the gap. Since the film member is flexible and thinner than the gap, and the portion connected to the frame is separated from the portion in contact with the liquid crystal panel in the film member, even when there is variation in the size of the gap or the thickness of the film member, this variation can be absorbed by the deformation of the film member, and no large load is placed on the liquid crystal panel. Since the film member is thinner than the gap, there is no increase in the thickness of the liquid crystal display device. Furthermore, since there is no need to use an expensive cushioning member, the cost of the liquid crystal display device can be minimized.

The first portion is positioned in the direction perpendicular to the display surface in a location that is closer to the portion covering the periphery of the display surface of the liquid crystal panel in the frame than the display surface of the liquid crystal panel, and the film may be bent so that the second portion is farther from the portion covering the periphery of the display surface of the liquid crystal panel in the frame than the first portion. The second portion of the film member can thereby be brought into contact with the liquid crystal panel.

Alternatively, the first portion may be positioned in the direction perpendicular to the display surface so as to be farther from the portion covering the periphery of the display surface of the liquid crystal panel in the frame than the display surface of the liquid crystal panel. The second portion of the film member can thereby be brought into contact with the liquid crystal panel without performing a step for bending the film member. At this time, double-sided tape may be provided for attaching the first portion of the film member to the frame, wherein the tape is thicker than the gap between the liquid crystal panel and the frame, and is interposed between the film member and a portion that does not include the portion covering the periphery of the display surface of the liquid crystal panel in the frame. The first portion of the film member can thereby be placed in a location farther from the frame than the display surface of the liquid crystal panel without performing special processing of the frame, and the first portion can be conveniently connected to the frame.

Furthermore, the frame material is preferably black or gray in color. Light leakage can thereby be more reliably prevented.

It is also preferred that the film member be strip-shaped and that this film member be positioned along the edges of the frame opening. The film member is thereby efficiently utilized and the gap between the frame and the liquid crystal panel can be blocked.

By providing a film member between the frame and the liquid crystal panel and making the film member thinner than the gap between the frame and the liquid crystal panel according to the present invention, a liquid crystal display device can be provided at low cost whereby light leakage and the ingress of debris are prevented without applying a large load to the liquid crystal panel or increasing the thickness of the device as a whole.

DETAILED DESCRIPTION OF THE PREFERRED EMBODIMENTS

Figure 1:
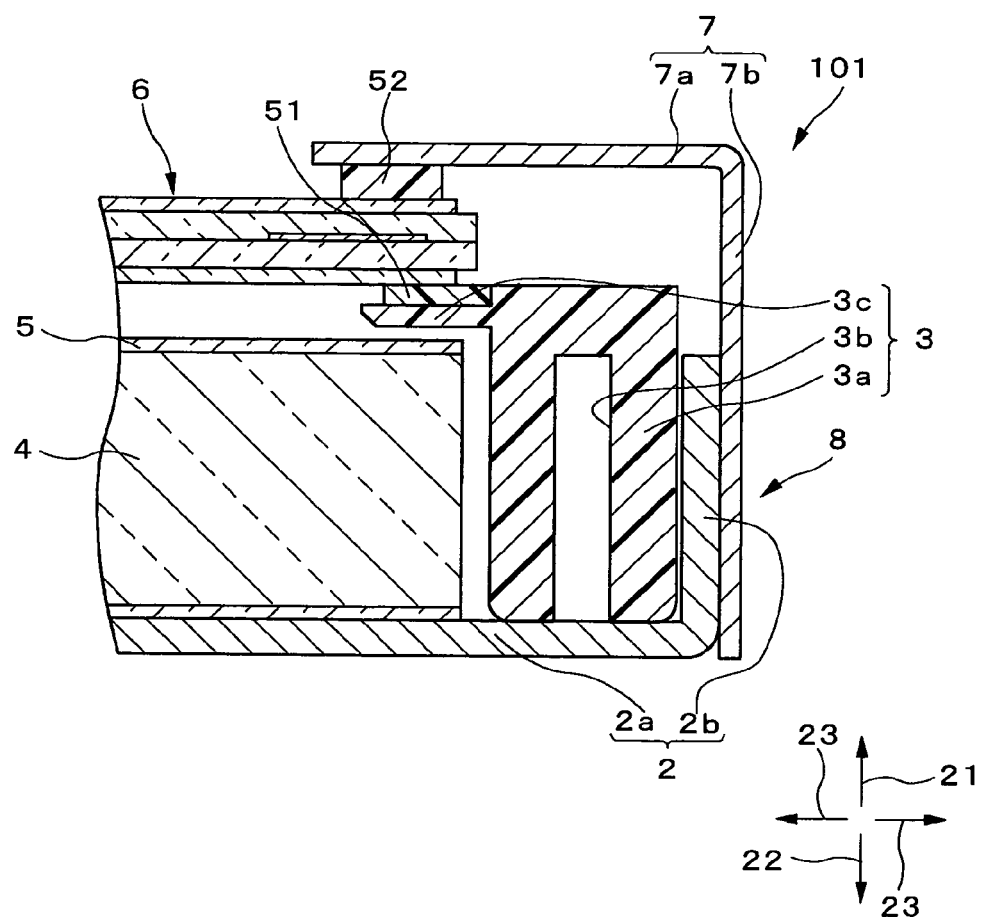
FIG. 1 is a local sectional view of a conventional liquid crystal display device.

Embodiments of the present invention will be described in detail hereinafter with reference to the accompanying drawings. A first embodiment of the present invention will first be described. FIG. 2 is a local sectional view of the liquid crystal display device according to the present embodiment. In contrast with the conventional liquid crystal display device 101 shown in FIG. 1, the cushioning member 52 is not provided in the liquid crystal display device 1 of the present embodiment, and a film member 10 is provided between the liquid crystal panel 6 and the front frame 7.

The film member 10 is strip-shaped, and the thickness thereof is less than that of the gap between the liquid crystal panel 6 and the front frame 7. The end part 10a in the width direction of the film member 10 is attached to the back surface of the front panel 7a of the front frame 7 by an adhesive or by double-sided tape (not shown in the drawing). Accordingly, the end part 10a is placed in a position that is closer to the front panel 7a of the front frame 7 than the front surface, that is, the display surface, of the liquid crystal panel 6 in the direction (depth direction) perpendicular to the front surface of the liquid crystal panel 6. The film member 10 is bent so as to face towards the rearward direction 22 with increased distance from the end part 10a, that is, so that the other end part 10b in the width direction of the film member 10 is farther from the front panel 7a than the end part 10a. The other end part 10b is in contact with the front surface of the liquid crystal panel 6.

The film member 10 is formed using PET (polyethylene terephthalate) or another flexible resin, for example, and the thickness thereof is 25 to 100 μm, for example. The film member 10 is black or gray in color. Four such strip-shaped film members 10 are arranged in a rectangular frame shape along the edges of the opening 7c so as to surround the opening 7c of the front frame 7. The film members 10 are thus arranged in positions corresponding to the edge portions surrounding the display area of the liquid crystal panel 6. In the liquid crystal display device 1, double-sided tape 51 (see FIG. 1) is not provided, and the back surface of the liquid crystal panel 6 is in direct contact with the extension 3c of the resin chassis 3.

Figure 2:
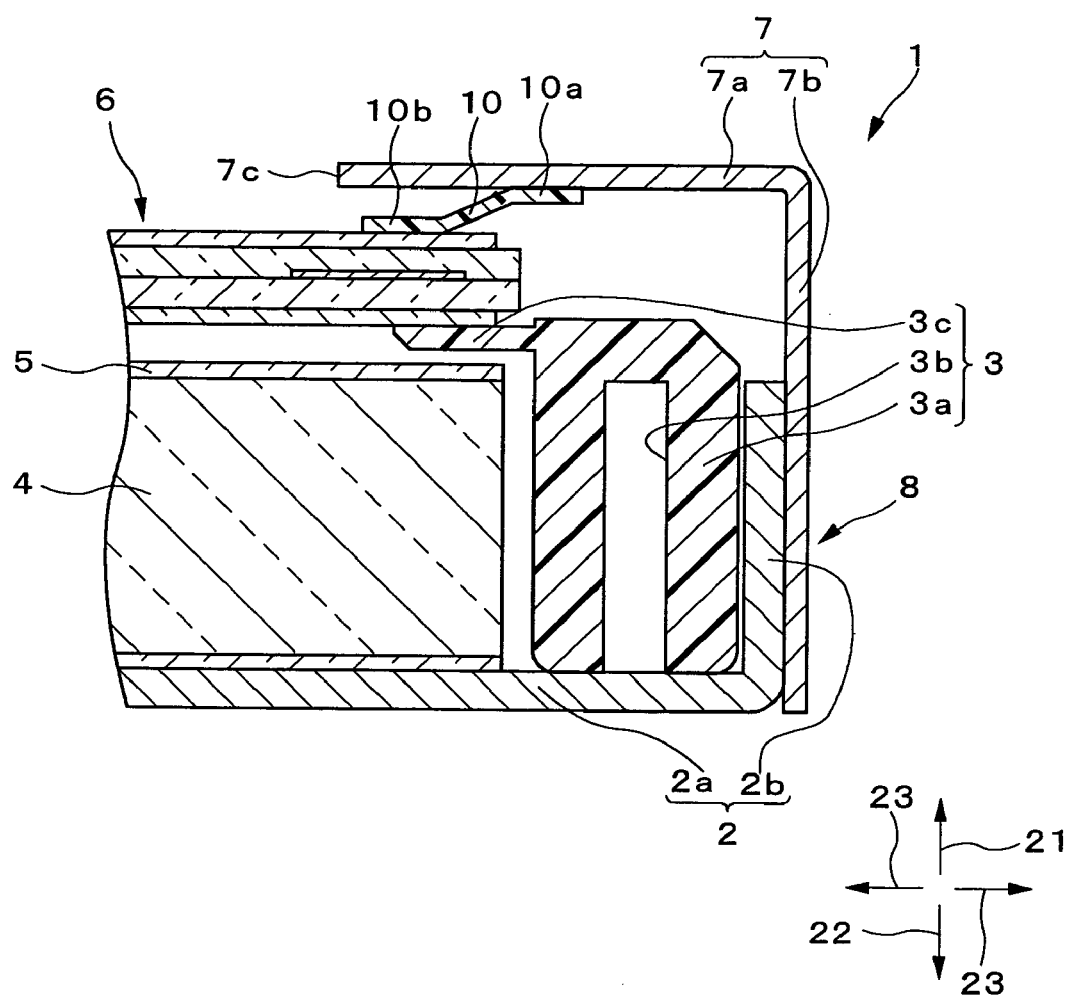
FIG. 2 is a local sectional view of the liquid crystal display device according to a first embodiment of the present invention.

Components other than those described above in the liquid crystal display device 1 according to the present embodiment have the same configuration as in the liquid crystal display device 101 shown in FIG. 1. Specifically, a box-shaped rear frame 2 is provided to the liquid crystal display device 1. In this rear frame 2, a rectangular base panel 2a is integrally formed with four side panels 2b that stand perpendicularly (specifically, in the forward direction 21) with respect to the surface of the base panel 2a from the edges of the base panel 2a. A frame-shaped resin chassis 3 is provided inside the rear frame 2, and this resin chassis 3 is composed of a main body 3a molded in integral fashion with the extension 3c. The main body 3a is provided parallel to the side panels 2b of the rear frame 2, and the outer surface thereof is adjacent to the inner surface of the side panels 2b of the rear frame 2. In the plane that includes the lateral direction 23, the main body 3a is elbow-shaped in cross-section, and a groove 3b is formed on the rear surface thereof. The extension 3c extends towards the inside of the frame from the portion on the forward direction 21 side of the side surface that forms the inner surface of the frame in the main body 3a.

An optical waveguide 4 and a lamp (not shown in the drawing) for emitting light are provided inside the resin chassis 3. The resin chassis 3 holds the lamp and optical waveguide 4 in place, and is fixed inside the rear frame 2. The lamp is positioned at the end inside the resin chassis 3, and is configured so as to emit light to the optical waveguide 4. The optical waveguide 4 is positioned at the center inside the resin chassis 3, and is configured so that light emitted from the lamp enters the side surface of the optical waveguide 4, and the light is emitted in the forward direction 21 from the front surface of the optical waveguide 4. An optical sheet 5 is further affixed to the front surface of the optical waveguide 4. The optical waveguide 4 and the optical sheet 5 are positioned behind the extension 3c of the resin chassis 3, and the peripheral edges of the optical waveguide 4 and the optical sheet 5 are held between the base panel 2a of the rear frame 2 and the extension 3c of the resin chassis 3. The backlight is formed from the resin chassis 3, the lamp, the optical waveguide 4, and the optical sheet 5.

A liquid crystal panel 6 is also provided in front of the extension 3c of the resin chassis 3. The periphery of the rear surface of the liquid crystal panel 6 is in contact with the front surface of the extension 3c of the resin chassis 3. As viewed from the forward direction 21, the liquid crystal panel 6, the optical sheet 5, and the optical waveguide 4 are arranged in substantially the same position. The liquid crystal panel 6 is an IPS-type liquid crystal panel, for example.

A front frame 7 is also provided so as to cover the front and sides of the rear frame 2. The front frame 7 is one size larger than the rear frame 2, and the rear frame 2 is fitted inside the front frame 7. The frame 8 is formed from the rear frame 2 and the front frame 7. A frame-shaped front panel 7a and four side panels 7b that stand towards the rearward direction 22 from the edges of the front panel 7a are provided to the front frame 7, and the front panel 7a and side panels 7b are integrally molded. A rectangular opening 7c is also formed in the center of the front panel 7a. The front panel 7a of the front frame 7 is positioned in front of the liquid crystal panel 6, and the side panels 7b are positioned on the outside of the side panels 2b of the rear frame 2. As a result, the front frame 7 covers the periphery of the liquid crystal panel 6, the resin chassis 3, and the side panels 2b of the rear frame 2. The front panel 7a of the front frame 7 also covers the front surface of the liquid crystal panel 6, that is, the periphery of the display surface, and the central portion of the liquid crystal panel 6, that is, the display area, is exposed in the opening 7c. As previously mentioned, the liquid crystal panel 6 and the front frame 7 are not in contact with each other, a gap is provided between the front panel 7a of the front frame 7 and the liquid crystal panel 6, and the film member 10 is positioned in this gap.

The reasons for the numerical limits in each structural condition of the present invention will be described hereinafter.

Film Member Thickness: 25 to 100 μm

When the thickness of the film member is less than 25 μm, the process for bending the film member becomes difficult to perform. Since the film member is too thin, its rigidity decreases, and the workability thereof in the operation for affixing the film member to the frame is adversely affected. Furthermore, the film member becomes more transparent to light, and is therefore less effective at preventing light leakage. When the film member is thicker than 100 μm, the rigidity of the film member becomes too high with some materials of the film member, the load imparted to the liquid crystal panel increases, and display abnormalities can occur. When portions of the gap between the frame and the liquid crystal panel decrease in size, there is no longer any room for the film member to change shape, and load can be applied to the liquid crystal panel. Therefore, the thickness of the film member is preferably 25 to 100 μm. However, since the appropriate range for the thickness of the film member also varies according to the internal structure of the liquid crystal display device, it is sometimes appropriate that the thickness of the film member be less than 25 μm or more than 100 μm. For example, the angle at which the film member is bent may be kept to the minimum angle by which the distal end of the film member touches the liquid crystal panel, and the load imparted to the liquid crystal panel can be minimized.

Figure 3:
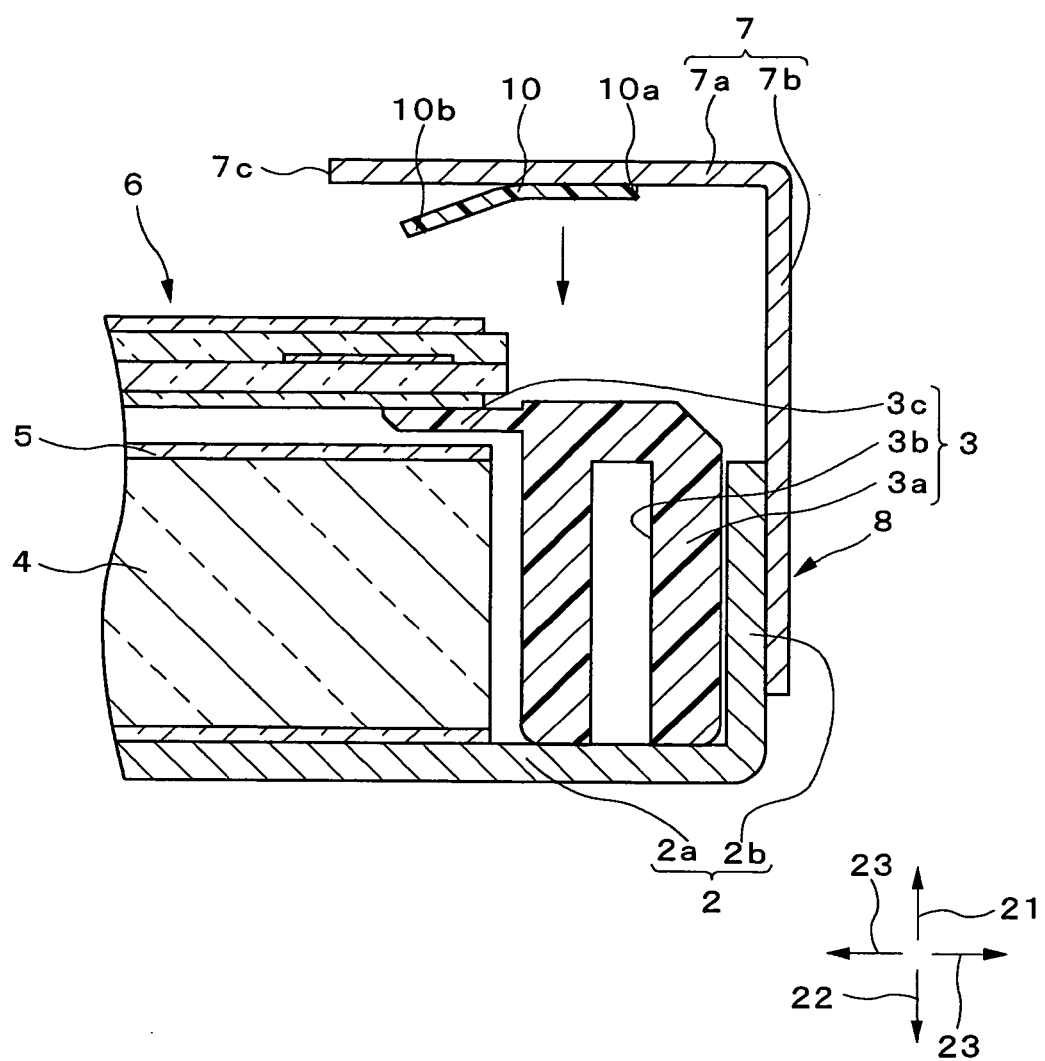
FIG. 3 is a local sectional view of the manufacturing method for the liquid crystal display device according to the present embodiment.

The manufacturing method for the liquid crystal display device 1 according to the present embodiment will next be described. FIG. 3 is a local sectional view of the manufacturing method for the liquid crystal display device according to the present embodiment. First, the resin chassis 3, the lamp (not shown in the drawing), the optical waveguide 4, the optical sheet 5, and the liquid crystal panel 6 are arranged inside the rear frame 2.

The front frame 7 and the film member 10 are prepared. The film member 10 is formed from PET or another flexible resin, for example, and has a strip shape, a thickness of 25 to 100 μm, and a black or gray color. The end part 10a in the width direction of the film member 10 is attached to the back surface of the front panel 7a of the front frame 7 by an adhesive or by double-sided tape (not shown in the drawing). The film member 10 is bent in the width direction thereof so that the distance of the film member 10 from the front panel 7a of the front frame 7 increases moving away from the end part 10a.

Next, after the front frame 7 is positioned in front of the rear frame 2, the front frame 7 is moved towards the rear, whereby the front frame 7 is fitted into and fixed in the rear frame 2. At this time, the inner surfaces of the side panels 7b of the front frame 7 are brought into contact with the outer surfaces of the side panels 2b of the rear frame 2. The front panel 7a of the front frame 7 is also configured so as to leave a gap larger than the thickness of the film member 10 between the front panel 7a and the liquid crystal panel 6 without coming into contact with the liquid crystal panel 6, and so that the other end part 10b in the width direction of the film member 10 comes into contact with the front surface of the liquid crystal panel 6. The liquid crystal display device 1 according to the present embodiment is thereby manufactured.

In the present embodiment, the film member 10 is provided between the liquid crystal panel 6 and the front frame 7, whereby the pathway by which debris enters the frame 8 from the outside can be blocked and the debris can be prevented from penetrating into the frame 8. By providing the film member 10, light emitted from the backlight and transmitted through the liquid crystal panel 6 can be prevented from being diffusely reflected between the liquid crystal panel 6 and the front frame 7 and leaking from the gap between the liquid crystal panel 6 and the front frame 7. Furthermore, since the film member 10 is colored black or gray, prevention of light leakage can be highly effective. Reduced display quality due to light leakage and the ingress of debris into the frame 8 can thereby be prevented.

Since the gap between the liquid crystal panel 6 and the front frame 7 is set to be larger than the thickness of the film member 10, and the film member 10 only lightly contacts the liquid crystal panel 6, the film member 10 does not exert a large physical load on the liquid crystal panel 6. Since the film member 10 has a small thickness of 25 to 100 μm, and is formed from PET or another soft material, the film member 10 is highly flexible. Therefore, even when there is low precision in the shapes of the members constituting the liquid crystal display device 1, and there is considerable fluctuation in the gap between the front frame 7 and the liquid crystal panel 6, or when the thickness of the film member 10 fluctuates, the fluctuation can be absorbed by the deformation of the film member 10, and no large load is therefore exerted on the liquid crystal panel 6.

In the present embodiment, double-sided tape and silicone spacers are not provided between the resin chassis 3 and the liquid crystal panel 6. Therefore, the liquid crystal panel is not bonded to the resin chassis, and a continuous load is not placed on the liquid crystal panel when either the liquid crystal panel or the resin spacer is warped. Even when there are rapid changes in the temperature of the environment in which the liquid crystal display device is placed, load is not exerted on the liquid crystal panel 6 by the heat deformation of the double-sided tape or silicone spacer. Display abnormalities arising from a physical load can be prevented since the physical load applied to the liquid crystal panel 6 can be minimized in the present embodiment. In the present embodiment, a particularly significant effect is obtained because an IPS-type liquid crystal panel is used as the liquid crystal panel 6.

In the present embodiment, since a film member having a thickness of 25 to 100 μm, for example, is provided instead of a cushioning member having a thickness of 0.3 to 1.0 mm, for example, between the liquid crystal panel 6 and the front frame 7, the gap between the liquid crystal panel 6 and the front frame 7 can be reduced in size compared to that of the conventional liquid crystal display device 101 shown in FIG. 1. The liquid crystal display device can thereby be made thin.

Furthermore, in the present embodiment, the material cost of the liquid crystal display device can be reduced since there is no need to provide a cushioning member composed of expensive silicone rubber or foam material, and the film member 10 composed of PET or another low-cost material is attached to the front frame by an adhesive, double-sided tape, or another thin pressure-sensitive adhesive material. Since the strip-shaped film member 10 is affixed so as to align with the edges of the opening 7c in the front panel 7a of the front frame 7, there is no wasting of the film member 10, and the material cost of the liquid crystal display device can be even further reduced.

Figure 4:
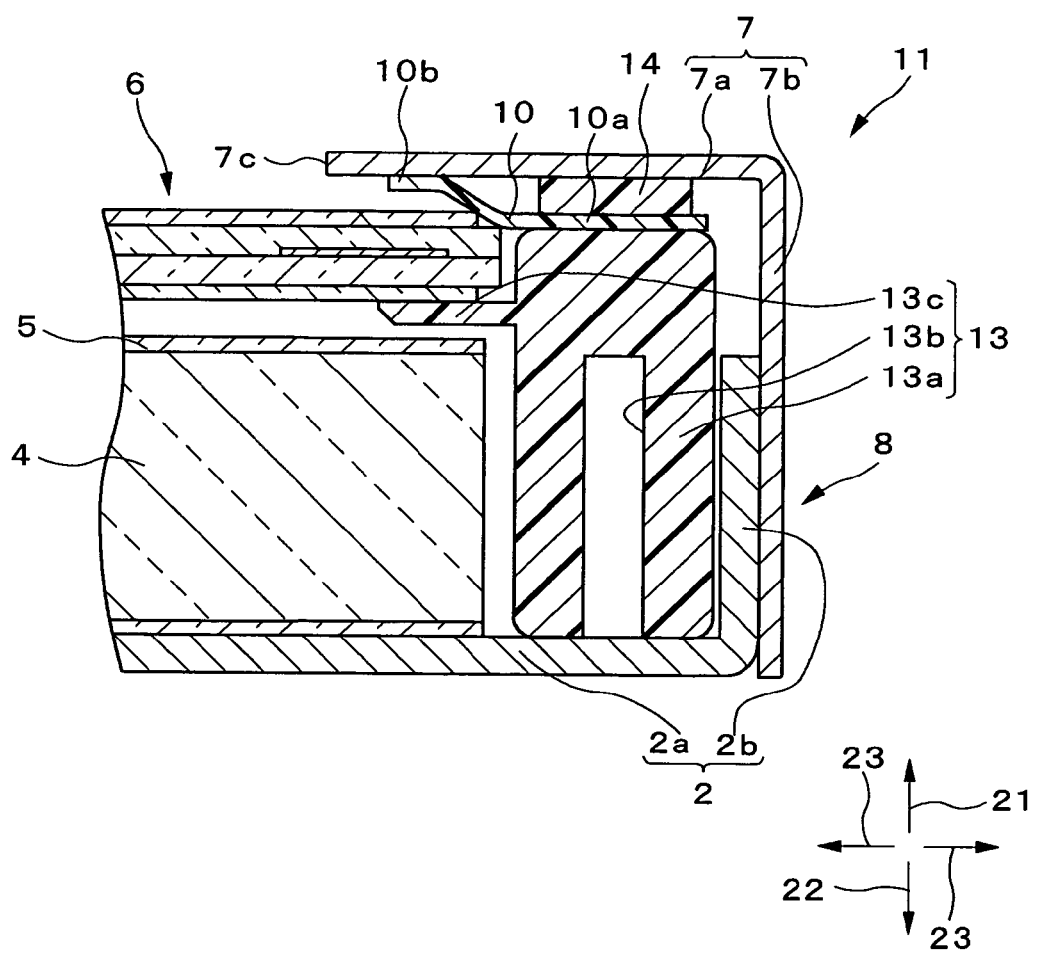
FIG. 4 is a local sectional view of the liquid crystal display device according to a second embodiment of the present invention.

A second embodiment of the present invention will next be described. FIG. 4 is a local sectional view of the liquid crystal display device according to the present embodiment. The liquid crystal display device 11 according to the present embodiment differs from the liquid crystal display device 1 (see FIG. 2) according to the previously described first embodiment in that a resin chassis 13 is provided instead of the resin chassis 3, double-sided tape 14 that is thicker than the gap between the liquid crystal panel 6 and the front panel 7a of the front frame 7 is provided between the film member 10 and the front panel 7a of the front frame 7, and the film member 10 is affixed to the front panel 7a by this double-sided tape 14. The double-sided tape 14 is attached to a portion that does not include the portion covering the periphery of the liquid crystal panel 6 in the front panel 7a of the front frame 7, that is, the portion in the front panel 7a that does not overlap the liquid crystal panel 6, and is interposed between the front panel 7a and the end part 10a of the film member 10.

The resin chassis 13 is elongated in the depth direction of the main body 13a in comparison to the resin chassis 3 (see FIG. 2), whereby the end part on the forward side of the main body 13a of the resin chassis 13 comes into contact with the film member 10. As a result, a gap no longer exists between the resin chassis 13 and the front panel 7a of the front frame 7.

Since the double-sided tape 14 is thicker than the gap between the liquid crystal panel 6 and the front panel 7a of the front frame 7, the end part 10a adjacent to the double-sided tape 14 in the film member 10 is positioned farther back, that is, in a position that is farther from the front panel 7a than the front surface (display surface) of the liquid crystal panel 6. The film member 10 therefore comes into contact with the corner of the liquid crystal panel 6 and is curved, and the end part 10b of the film member 10 is in contact with the front panel 7a of the front frame 7. The gap between the liquid crystal panel 6 and the front panel 7a of the front frame 7 is thereby blocked with the film member 10. Aspects of the configuration other that those described above in the present embodiment are the same as in the aforementioned first embodiment.

Figure 5:
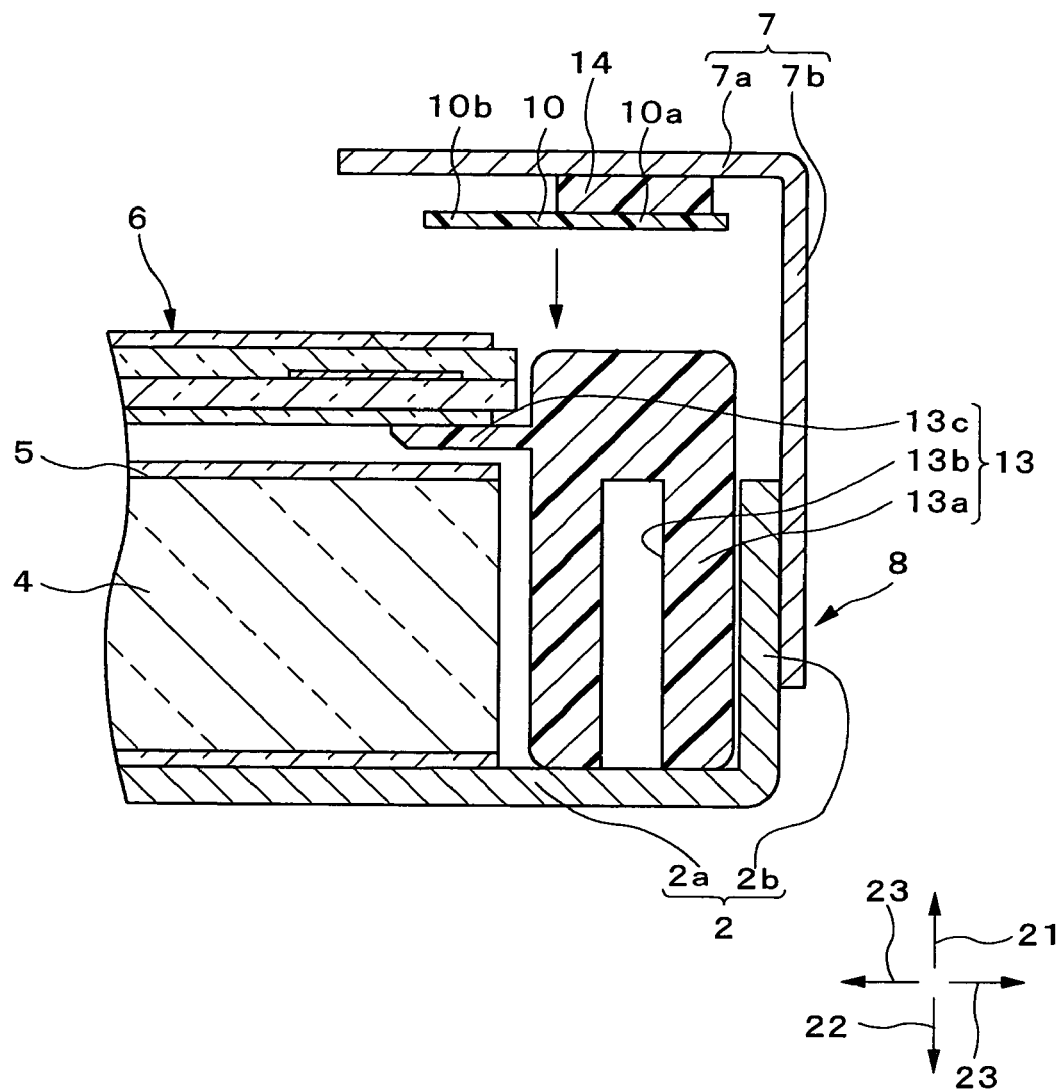
FIG. 5 is a local sectional view of the manufacturing method for the liquid crystal display device according to the present embodiment.

The manufacturing method for the liquid crystal display device according to the present embodiment will next be described. FIG. 5 is a local sectional view of the manufacturing method for the liquid crystal display device according to the present embodiment. The resin chassis 13, the lamp (not shown in the drawing), the optical waveguide 4, the optical sheet 5, and the liquid crystal panel 6 are arranged inside the rear frame 2. The front frame 7 and the film member 10 are also prepared. The end part 10a of the film member 10 is attached to the back surface of the front panel 7a of the front frame 7 by double-sided tape 14. At this time, a process for bending the film member 10 is not performed, and the film member 10 is arranged so that the direction from the end part 10a to the end part 10b in the film member 10 extends towards the opening 7c parallel to the front panel 7a of the front frame 7.

Next, the front frame 7 is positioned in front of the rear frame 2, and the front frame 7 is moved towards the rear, whereby the front frame 7 is fitted into and fixed in the rear frame 2. The front panel 7a of the front frame 7 is configured so that a gap remains that is smaller than the thickness of the double-sided tape 14 between the front panel 7a and the liquid crystal panel 6 without coming into contact with the liquid crystal panel 6 at this time. The position of the end part 10a in the film member 10 is thereby placed farther towards the rear than the front surface of the liquid crystal panel 6, the center portion between the end part 10a and the end part 10b in the film member 10 is in contact with the corners of the liquid crystal panel 6, the film member 10 is bent so that the end part 10b thereof is positioned farther forward than the end part 10a, and the end part 10b is in contact with the rear surface of the front panel 7a of the front frame 7. The liquid crystal display device 1 according to the present embodiment is thus manufactured.

According to the present embodiment, the gap between the liquid crystal panel 6 and the front panel 7a of the front frame 7 is blocked by the film member 10. Therefore, light leakage and the ingress of debris into the frame 8 can be prevented in the same manner as in the aforementioned first embodiment. Since the film member 10 is flexible, the film member 10 can minimize the physical load applied to the liquid crystal panel 6, and the display quality is unaffected.

In the present embodiment, the film member 10 blocks not only the gap between the liquid crystal panel 6 and the front panel 7a of the front frame 7, but also the gap between the resin chassis 13 and the front panel 7a of the front frame 7. Debris is therefore prevented from entering from behind the liquid crystal display device 11, that is, from the space between the rear frame 2 and the front frame 7. Since there is also no need for a process for bending the film member 10 during manufacturing of the liquid crystal display device, the manufacturing process for the liquid crystal display device can be simplified in comparison to that of the aforementioned first embodiment. Effects other than those described above in the present embodiment are the same as those obtained in the first embodiment.

The distal end of the front side of the resin chassis in the first embodiment may also be brought into contact with the front panel of the front frame, the same as in the second embodiment. An example was described in the first and second embodiments in which an edge light-type backlight was used as the backlight, but the present invention is not limited to this option alone, and a backlight that is placed directly behind the liquid crystal panel may also be used. Regardless of the type of backlight, the present invention may be applied to any type of liquid crystal display device insofar as the liquid crystal display device is provided with a liquid crystal panel and a frame.

The present invention as described above may be advantageously utilized in a liquid crystal display device provided with a liquid crystal panel and a frame.

What is claimed is:

1. A liquid crystal display device, comprising:
   a liquid crystal panel having a display surface;
   a frame positioned so as to cover the periphery of the display surface of the liquid crystal panel without coming into contact with said liquid crystal panel; and
   a relatively flat film member having a first end portion connected directly to said frame, a second end portion separated from said first end portion directly in contact with the display surface of said liquid crystal panel, and a thickness that is smaller than a gap between said liquid crystal panel and said frame,
   wherein said first end portion is positioned in the direction perpendicular to said display surface in a location that is closer to the portion covering the periphery of the display surface of said liquid crystal panel in said frame than the display surface of said liquid crystal panel, and said relatively flat film member is slightly bent so as to block the gap and so that said second end portion is spaced linearly farther from the portion covering the periphery of the display surface of said liquid crystal panel in said frame than said first end portion.

2. The liquid crystal display device according to claim 1, wherein said first end portion is positioned in the direction perpendicular to said display surface so as to be farther from the portion covering the periphery of the display surface of said liquid crystal panel in said frame than the display surface of said liquid crystal panel.

3. The liquid crystal display device according to claim 2, having double-sided tape for attaching said first end portion of said relatively flat film member to said frame, wherein the tape is thicker than the gap between said liquid crystal panel and said frame, and is interposed between said relatively flat film member and a portion that excludes the portion covering the periphery of the display surface of said liquid crystal panel in said frame.

4. The liquid crystal display device according to claim 1, wherein the thickness of said relatively flat film member is 25 to 100 μm.

5. The liquid crystal display device according to claim 1, wherein said relatively flat film member is black or gray in color.

6. The liquid crystal display device according to claim 1, wherein said relatively flat film member is strip-shaped, and said relatively flat film member is positioned along the edges of the opening of said frame.

7. The liquid crystal display device according to claim 1, wherein said liquid crystal panel comprises an in-plane-switching liquid crystal panel.

8. The liquid crystal display device according to claim 1, having a chassis for holding said liquid crystal panel against said frame, wherein the chassis is in contact with said relatively flat film member.

9. The liquid crystal display device according to claim 1, wherein said first end portion is attached to a back surface of a face of said frame.

10. The liquid crystal display device according to claim 1, wherein said relatively flat film oblique angles between a bottom of the third end portion and the display surface and a top of the third end portion and said frame member has a third end portion connecting the first end portion and second end portion, the third end portion being a straight and forming.

11. A liquid crystal display device, comprising:
    a liquid crystal panel;
    a frame positioned so as to cover the periphery of the display surface of the liquid crystal panel without coming into contact with said liquid crystal panel; and
    a film member having a first portion connected to said frame, a second portion separated from said first portion and in contact with said liquid crystal panel, and a thickness that is smaller than the gap between said liquid crystal panel and said frame,
    wherein the thickness of said film member is 25 to 100 μm.

* * * * *